April 6, 1926. 1,579,464
J. G. ZIMMERMAN
METHOD OF AND MEANS FOR PRODUCING COLORED PHOTOGRAPHS
Filed Dec. 13, 1918 4 Sheets-Sheet 1

Inventor
James G. Zimmerman
By Brown, Hanson & Boettcher
Attorneys

April 6, 1926. 1,579,464
J. G. ZIMMERMAN
METHOD OF AND MEANS FOR PRODUCING COLORED PHOTOGRAPHS
Filed Dec. 13, 1918     4 Sheets-Sheet 3

Inventor
James G. Zimmerman
By Brown Hanson & Boettcher
Attorneys

April 6, 1926.    J. G. ZIMMERMAN    1,579,464
METHOD OF AND MEANS FOR PRODUCING COLORED PHOTOGRAPHS
Filed Dec. 13, 1918    4 Sheets-Sheet 4

Inventor
James G. Zimmerman
By Brown Hanson & Bottcher
Attorneys

Patented Apr. 6, 1926.

1,579,464

UNITED STATES PATENT OFFICE.

JAMES G. ZIMMERMAN, OF MILWAUKEE, WISCONSIN.

METHOD OF AND MEANS FOR PRODUCING COLORED PHOTOGRAPHS.

Application filed December 13, 1918. Serial No. 266,536.

*To all whom it may concern:*

Be it known that I, JAMES G. ZIMMERMAN, a citizen of the United States, residing at Milwaukee, in the county of Milwaukee and State of Wisconsin, have invented a certain new and useful Improvement in Methods of and Means for Producing Colored Photographs, of which the following is a full, clear, concise, and exact description, reference being had to the accompanying drawings, forming a part of this specification.

My invention relates to color photography and has to do especially with simplified and improved means for and methods of producing colored pictures, true to nature, by means of photographic processes.

In its more simple aspect my improvement involves the production of a negative which is preferably divided into line-like areas having certain related color values, and the production from this negative, which is in black and white, of a contact print upon a prepared sensitized sheet which has similar and registerable line-like areas which areas are suitably colored.

In order to produce the negative and the print above outlined, many new and newly applied photo-chemical, physico-chemical, and mechanical ideas have been evolved to accomplish the several steps which go to make up my complete process.

There are several basic principles in the science of light and color which are involved in any color reproduction process or method.

One of these is the fact that white or uncolored light can be divided into three component or primary colors, by the proper intermingling or mixing of which all colors or shades of the spectrum may be produced, and furthermore each of these three primary or component colors has its complementary color. To illustrate, the three primary or component colors of white or uncolored light are red, green and violet. These three colors will, upon properly blending them, produce all the colors of the spectrum, thus if we cover an area with a mixture of small red and green dots the appearance to the eye will be that the surface is colored yellow, likewise red and violet will produce a purple and violet with green a blue, also various combinations of all these three will give us any color desired.

Almost all objects which are to be photographed in colors contain many different colors, shades and depths of colors, and it is this infinite variety of color shade and depth that must be accurately reproduced if we are to produce a true colored picture. It has been determined, as above indicated, that the light reflected by any object and which constitutes its color as seen by the eye, can be broken up into the specified three primary or component colors and a record made of each, and then by properly recombining these three records a picture can be produced which will show the object in its true colors.

In color photography it is well known that by placing a clear or transparent colored screen or filter between the object and the negative in taking a photograph, certain colors can be eliminated and the resultant negative will have a certain definite color value, although this will be expressed in black and white only. This is illustrated by the well known fact that if a red screen be interposed, all of the light except the red rays will be absorbed and the consequent negative will be a record of the red rays only except as to depth of shade which will be faithfully recorded in shades of black and white or as they appear in gray. In like manner a color value record can be produced which will faithfully record the green rays and another the violet rays, and then as by the well known Ives three color process, a colored picture can be produced by the use of these three records which will faithfully portray the object in its natural or true colors.

But the Ives and all other three-color processes, so far as I am aware, are complicated and cumbersome, they are not suitable for the direct taking and printing of pictures in colors. They cannot be made use of nor are they of any benefit to the great body of photographers, both professional and amateur, and it is a particular object of my invention to provide a color photographic process or method which shall be so simple in picture taking and producing steps that colored pictures of substantially perfect quality can be taken and produced by the ordinary amateur photographer, it only being necessary for such amateur to make use of my improved screen and print blank under very simple directions, exposing, developing and printing in the manner with which he is familiar and the result will be a picture in colors instead of a picture in black and white.

In my improved method I provide a taking screen or color filter which I interpose between the lens and the sensitive plate or film, preferably in close contact with the sensitive plate or film, the screen being a combination screen of the three colors necessary, the three colors or colored portions being preferably arranged in associated areas of such dimensions that they appear to the eye to blend perfectly together.

I preferably arrange these areas in parallel line-like areas extending parallel to one edge of the plate in order to simplify the registration in the following steps of producing a picture, but it will be obvious that considered in its broader aspect, the form of these areas is not thus limited.

In order that a clear understanding may be had of my invention and the various steps and several photo-chemical and mechanical details thereof, attention is directed to the accompanying drawings. It should be understood that said drawings are mostly diagrammatic and merely illustrative of the various steps and effects.

In order to give a clear understanding of the processes involved in my improvement in color photography, I will first describe the several steps in a general way and in connection with the diagrammatic illustrations. These steps comprise chemical, physico-chemical and mechanical ideas, each one of which is relatively simple in itself, but they must all be understood in order to comprehend my improvement.

As is well known to those familiar with the art of photography, there are two processes in common use today for obtaining light impressions on paper, glass, celluloid or other surfaces. One depends on the action of light on the silver salts suspended in some colloid as gelatine, which may be rendered evident by development. The other is the carbon process which depends upon the action of light on a colloid such as gelatine, holding a colored or other powder in suspension which has previously been sensitized by the use of some chemical as potassium bichromate. Proper treatment thereafter will produce a record of the light action.

It is also well understood that the silver salts are affected by light roughly in direct proportion to the intensity of illumination or amount of light striking the salt. Consequently where we have a variable quantity of light striking the plate surface we will get a proportionately dense action (photochemical action) on the silver salts so that when developed the plate will reproduce in density the strength of light affecting it. Where no light falls on the plate it will be clear after development and fixing in the usual manner.

It is well known that silver salts are not ordinarily sensitive equally to all colors of light that is, the rays of light at the blue end of the spectrum has a greater effect in proportion to the time of exposure than any other. Most photographic plates are not sensitive to red, or the red end of the spectrum. It is well known that films made by the use of silver salts and some colloid or a silver salts emulsion, can be rendered sensitive to all the bands of the spectrum from the deep red to the violet by bathing the plate in certain dyes which will in some manner change the effect of light on the silver salts so that the silver salts are made sensitive to the red of the spectrum. A plate so treated is called a "panchromatic plate" or a plate sensitive to all (pan) colors.

But so far it has not been possible to treat a plate so that all colors affect it with equal intensity. In order to balance the effect of different colors we use what is termed a balancing screen or color screen or filter. This screen or filter is dyed in such colors that when placed in line with or over the lens of a camera, it will cut down the intensity of the action of the blue end of the spectrum and leave the red end unaffected. Such a screen is called a taking filter screen or balancing filter.

It will now be understood that with a panchromatic plate in the camera and a balancing screen over the lens, we can get a photographic record of any vari-colored object on the plate or film with densities of blackness in proportion to the strength or intensity of illumination over each colored part of the object. Thus a record in black and white like any other ordinary photographic plate negative will result, only the differences in density or blackness will be different. The ordinary plate will show a deep red as a pure white, while the panchromatic plate will show deep red as a gray or black and of an intensity in accordance with the intensity of light coming from the red. In other words, a panchromatic plate records the light rays (when used with their proper balancing filter screen) in their true relative illuminating intensity.

The above is a brief description of the silver salts sensitive plate process of taking a record in true color values of any object or scene. The other process is well known and is called the carbon process.

Roughly this process consists in producing an opaque film proportionate in thickness to the intensity of the light or the effect of the light upon the film.

Figures 2, 3, 4, 5:
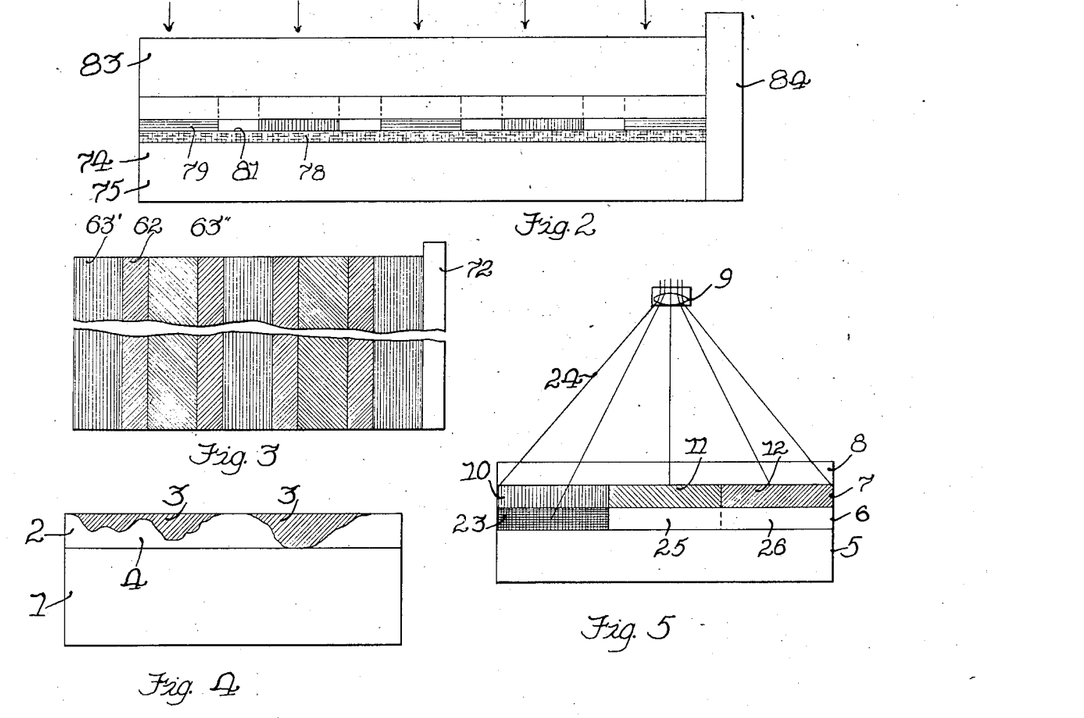
Figure 2 is a similar view illustrating the printing of a picture upon my improved print blank by means of the color value negative produced as in Figure 1.
Figure 3 is a fragmentary plan view of the screen plate shown in Figure 1.
Figure 4 is a diagrammatic view illustrating the effect of light on gelatine which has been treated with potassium bichromate.
Figures 5 to 17 inclusive are diagrammatic views explanatory of the principles involved in the production of my improved screen as shown in Figures 1 and 3.

It is well known that when a gelatine or glue is treated with a solution of potassium bichromate or ammonium bichromate or some similar sensitizing solution, the effect of light on such treated gelatine or glue, when dry, is to cause it to become insoluble in hot water whereas ordinary gelatine or glue is readily so soluble. Consequently if a negative produced by any process of photography showing in black and white is placed over another sheet of glass or celluloid coated with gelatine which has been treated with potassium bichromate and dried, the gelatine will be, after exposure to light for a proper time, rendered insoluble in hot water wherever the light gets through the silver negative deposit and will remain soluble wherever no light can reach it, because of the blackness or opaqueness of the negative above it. Consequently the gelatine film so acted upon will present various thicknesses of gelatine which are insoluble in hot water varying from no thickness at all where no light strikes it, to full thickness of the film where the light strikes thru clear parts of the negative. Figure 4 of the drawings illustrates this action of the light upon the film in a greatly exaggerated form. In this figure 1 is the glass plate or backing of the film, 2 is the gelatine film and the shaded portions 3 illustrate those portions which have been affected by the light and hardened so that they are insoluble in hot water. The clear portions 4 of the film remain soluble in water and, as hereinafter explained, can be removed from the film leaving the hardened portions only for further use.

In order to make a record of this kind so that it can be seen, there is usually added to the film, while manufacturing, a colored powder or carbon (lamp black). This print which is a positive as opposed to the negative under which it is exposed, is developed by washing the print or record with warm water so that gradually the soluble gelatine will wash away leaving the carbon carrying gelatine record in relief on the glass plate. The carbon picture will be a graduated film of gelatine holding the carbon powder and giving a print from the record called a "carbon print". The printing is, therefore, just like ordinary printing out or developing papers, only the developing is done by washing in warm water instead of by means of a developer.

These two processes, the silver salts film, and the carbon processes of making prints are both involved in my improved color photographic process, but there are several very important optical principles the relations of which must be understood before it is possible to give a clear idea of my invention.

Obviously if we printed the color records made in the ordinary way on carbon paper we would get black and white prints, not colored prints. The difference, however, would be that we would have a black and white print which would be a better record and more true to the eye as to the brightness of the object photographed than the ordinary photographic print. Thus, a red rose would be quite black in the ordinary negative print, while in a panchromatic negative print it would be a lighter hue.

So far as I am aware, no method has yet been produced by which a plate such as I have described, produced in black and white and giving color values distributed over its whole surface can be made use of to directly produce a colored picture. It has so far been necessary, so it seems, to mechanically divide the light into several component or primary colors and then by some means recombine these colors to form a picture presenting the original view in its natural colors.

As hereinbefore explained we need only consider three colors, viz: red, green and violet.

These three colors or their three complementary colors, blue, pink and yellow, on being properly blended will reproduce any other color of the spectrum.

In order to separate the records of the several colors and use the same for reproducing the original colors, I preferably make use of what is known as the complementary system, but before explaining this system and its application to my invention I will first explain my improved method of obtaining a negative which presents true color values so separated or divided that I can recombine them again in my final color printing process.

Referring to Figures 5 to 17 inclusive, a clear understanding may be had of the basic principles involved in the production of the color value record which I use.

Referring particularly to Figure 5; 5 represents the glass backing of the negative, which in this case is a panchromatic sensitive plate or film blank; 6 represents the sensitive film, 7 the film on the screen, and 8 the backing or the screen plate upon which the film is mounted; 9 represents the lens of the camera in which the negative and the screen are arranged, having their film surfaces in contact as shown. In other words, we place over the sensitive plate before exposure in the camera a screen consisting, in this instance, of three broad bands, red 10 and green 11 and violet 12, so that we will have the light from the object first pass through the screen before reaching the film on the panchromatic photographic plate. I have shown the several bands as each being one third of the width of the plate so that as the light strikes the plate one third of the light must go through the red band before striking the sensitive plate, another through the green and a third through the violet. If now we are photographing a red object the only part of the sensitive plate that will receive light will be the part under the red band, for obviously, a band of green or violet cannot let a red ray pass through, these bands being violet and green cannot transmit a ray they absorb. Consequently, only the red of the object that strikes the red band over the plate can get through and record on the film. Likewise if the object photographed were green, only that section of the plate under the green band would be affected and similarly with a violet object. However, if there were three colors in the object to photograph, such as red, green and violet, the plate would record wherever any light from the object struck through the color band of like color, consequently the plate would record each color and each record of the color will be opposite the band of like color in the taking screen. It is obvious that if the object were yellow, which color reflects both red and green light, the sensitive plate would record through both the red and the green bands giving a record on the negative plate opposite both bands. Likewise any color of the spectrum would split up into two or three parts, if not one of the primary colors of the color band. Consequently we will get a record of all the colors as where no band or taking screen is used, but we have a mechanical division of the color records which is a means for later reproducing the colors when printing the positive from the negative.

Figures 6, 7, 8, 9, 10, 11, 12, 13, 14, 15, 16, 17:
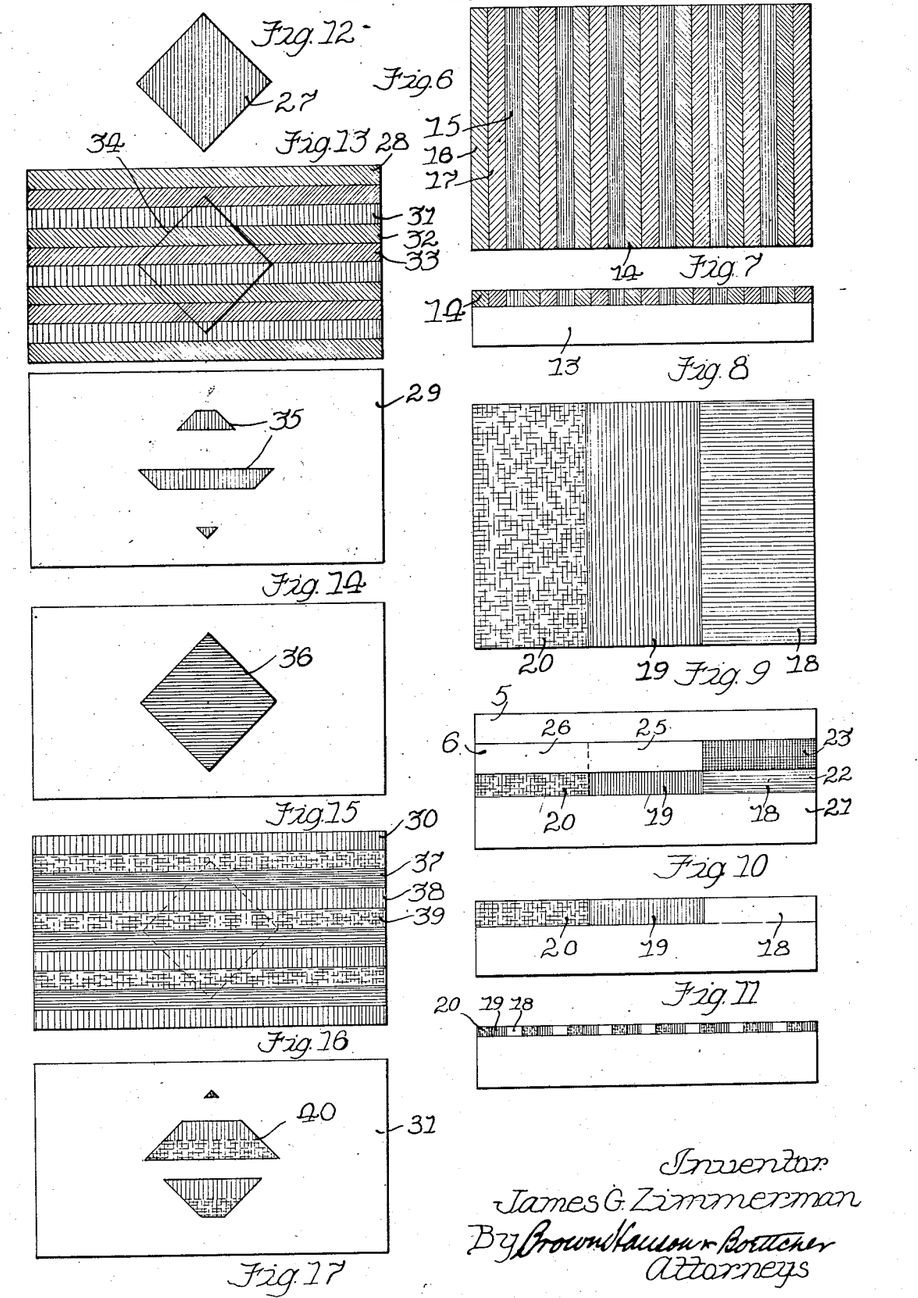

It can now be understood that if we use a taking screen which is made up of many narrow lines stained or colored as described, instead of but three as described in relation to Figure 5, we can divide the taking screen into a large number of three color or tricolor bands instead of one large band of three. I have illustrated this idea in Figures 6 and 7. In said figures 13 represents the packing of the screen which, of course, is clear glass or other transparent medium and 14 the colored or stained film upon the face of the screen. As shown, this film is divided into a plurality of colored bands or lines of the same three colors as I show in Figure 5, that is, red 15, green 16 and violet 17.

When we take a photographic record through this screen provided with the plurality of colored lines, we have a record which is exactly the same as that taken through the band of three lines shown in Figure 5; with this very important advantage, however, that subdividing of the large band into many makes it easier to get a complete or nearly complete record for the eye to view. To illustrate, if there were an object of red color in the picture and large enough to cover most of the plate, with a large band we would get only one-third part of the object in one piece on the plate under the red band, whereas if we use a line screen having a large number of bands the one-third picture of the object which would be produced beneath the red line would be spread out over the whole dimension of the image, giving its form and shape very well. Because of the many lines the eye would see in effect the full object as red and therefore the next step is to make the line screen of sufficient fineness as to width of lines to make the final picture true enough to nature to cause the eye to see it in almost true size, shape and color. The same reasoning regarding a red object holds for any other color. Fortunateely there are few objects to be photographed that are only one of the three pure colors, red, green or violet. Nearly every object is colored in a mixture of these in various degrees and with the result the negatives taken under such a line screen gives us a record not in line but better in bands forming practically a continuous record even though on close examination the record will appear lined.

Before going into the description of the production of my line screen for commercial use I will first describe how a colored picture can be produced by the use of such a negative. It is of course understood that in the making of a record to show color values we make use of the plate behind a screen which is properly colored to produce the light value record in parallel band form on the negative plate although of course it should be understood that it is not absolutely essential that the records be made in the form of parallel bands as they can be made in any other form of areas, the essential idea being that the three colors are arranged so that each covers substantially a third of the plate and the three together cover the complete surface of the plate.

As stated hereinbefore I preferably make use of the carbon process in the production of a colored picture from the light value record produced upon the plate. Instead of mixing carbon with the gelatine film we can color it any color desired and thus produce colored instead of black pictures. For a clear understanding of the process let us first consider the large three color band screen with only three bands of red, green and violet covering the whole plate, as shown in Figure 5 and let us produce a paper which we will use, on which to print the positive from the negative with three bands as illustrated in Figure 8 with a blue green colored gelatine band 18, a pink or magenta gelatine band 19 and a yellow gelatine band 20. In Figure 9, 21 represents the glass backing of the tri-color positive plate, 22 the colored film on its face, 5 is the backing of the negative and 6 is the film upon the face of the negative as referred to in reference to Figure 5.

Let us form a positive print blank with these three colored gelatine bands upon the surface and then treat the film with potassium bichromate so that they will be sensitive to light.

Such a positive is illustrated in Figures 8 and 9. If we now take the negative of an object which is a true bright red of the same color as the taking screen band on our three color screen as shown in Figure 5 we will get a record only back of the red band of the screen, as shown at 23 in Figure 5. 24 in Figure 5 illustrates the projection of red light on the screen and its possibility of penetration to the sensitive plate placed behind the screen. When we develop the plate so exposed, we will find that under the red band section of the screen there will appear on the negative a black deposit of silver in different gradations of density in accordance with the variable shape and color density of the object photographed. But under the other two bands of the screen the salts will not be affected and there will be no deposit of silver whatever. The section 23 on the negative in Figure 5 illustrates the deposit of silver under the red section of the taking screen after the exposed plate has been developed.

In Figure 9 I have illustrated the printing of the print blank shown in Figure 8 through the negative produced as shown in Figure 5 and I place the part or line 23 which was exposed under the red band of the screen over the blue green band 18 on the positive plate. The portion 25 which was beneath the green band of the screen is now placed over the pink or magenta band 19 of the positive plate and the portion 26 of the negative which was placed beneath the violet band 12 of the screen is now placed over the yellow band 20 of the positive plate and in each instance the complementary bands register accurately with their corresponding primary color locations in the screen plate to which the film was first exposed.

If now we expose the print paper to the light through the negative as shown in Figure 9, the blue-green band 18 of the print paper will be protected from the light and the pink or magenta and yellow bands not being protected will be rendered insoluble by the light; the blue band remaining soluble. After thus printing, the positive is washed in warm or hot water until all the soluble gelatine is washed away. The yellow and the pink gelatine bands remain on the paper. As our original object was red we have a final record of yellow, plus pink, which equals red, as shown in Figure 10, but as it will be seen the yellow pink record is not opposite to the original red record on the negative. Let us now consider the screen having narrow colored lines; if we make a record in the same manner using the screen with narrow lines obviously the same yellow pink record will result, but the lines will be fine instead of coarse and they can be made fine enough so that to the eye, the picture will appear almost exactly in proper relation to the original red image, as illustrated in Figure 11. Of course it is understood that the lines must be made narrow enough so that the eye will see the object correctly or nearly so. It will be understood, of course, that as explained for a red record, the other colored records will be likewise divided over the whole surface of the image and will produce their effect upon the eye. It will now be understood that the printing process, that is the process of producing a colored picture from a line record giving color values, comprises the printing or production of the tri-color lines, blue, pink, and yellow, in proper relation to the negative screen lines, red, green and violet.

To further and more clearly illustrate the several important steps involved in the process of first separating and then combining the colors in order to produce the colored photograph, I now refer particularly to Figures 12 to 17 inclusive, by which I have illustrated in a greatly exaggerated manner what occurs as to the separation and recombining of the colors by the use of my finely lined color selective screen used to produce the color value negative and when such negative is used to print on a similarly finely lined and colored print blank.

In said Figures 12 to 17, 27 represents a red object to be photographed, 28 represents a tri-colored screen such as shown in Figure 6, 29 represents a sensitive plate or film plate to be exposed beneath the screen 28, 30 is a tri-colored print blank which is to be printed through the negative, and 31 represents the print blank after exposure and washing.

The screen as shown, is divided into relatively wide lines or bands, red 31, green 32, and violet 33. In Figure 13, 34 represents the image of the article 27 as thrown on the screen plate and filtered through to the silver negative plate 29 beneath. As explained hereinbefore, the object being red, only the red rays will make any record on the negative plate, which will show in black patches 35 on the negative 29 when it is developed. These black patches or records as shown constitute parallel bands which occupy or cover one third of the image, that is, the spaces between adjacent bands are twice as wide as the bands themselves. Figure 15 shows to a better degree the actual relation of the red record, by the use of finely lined screens, that is, the one third record thus produced, with fine lines, is spread out over the whole area of the image 36 and the eye in looking at such a negative sees the whole image and not the isolated patches or bands shown in Figure 14.

Figure 16 illustrates the printing of the tri-colored print blank 30 through the negative 29. This print blank is covered with a three colored band similar to the screen and arranged to cause the red band 31 of the screen to register with the blue band 37 of the print, the green band 32 of the screen to register with the pink or magenta band 38 of the screen and the violet band 33 of the screen to register with the yellow band 39 of the print blank. Consequently when the print is washed after exposure we will have a picture 31' as shown in Figure 17. This is produced by the fact that the red having made a black record through the red band on the negative, these bands as shown at 35 in Figure 14, will be the only ones to obstruct the light falling upon the positive, consequently the light will not affect the gelatine beneath these bands 35 but will affect the gelatine on the clear spaces between the bands, 35, thus hardening the pink and yellow gelatine bands on the print blank 31 and producing a record in pink and yellow after the positive is washed and finished.

Another idea involved in this color process is that each of the primary colors has its complementary or secondary color, thus we have for the primary colors violet, green and red or red-orange, the three respective secondary or complementary colors, blue or blue-green, yellow and pink or magenta.

In the complementary color printing process as heretofore used the three color impressions are superposed instead of juxtaposed. In this method of this present invention the complementary colors are juxtaposed not superposed.

The principle which underlies this invention regarding the production of colors by the juxtaposition of complementary colors is well illustrated by the following equations between the primary colors red, green and violet on the one side and the complementary colors of yellow, magenta and blue-green on the other side.

(a) Yellow is made up of or equals red plus green.
(b) Magenta is made up of or equals red plus violet.
(c) Blue-green is made up of or equals green plus violet.

Looking at it from another point of view, yellow consists of the three primary colors, minus the violet; magenta consists of the three primary colors minus the green, and in like manner blue-green consists of the three primary colors minus the red.

Now when we combine the effect of yellow and magenta by placing them alongside of each other as in the additive method of producing color pictures, we have, taking the equations (a) and (b) the following:
(a) Yellow equals red plus green.
(b) Magenta equals red plus violet.
Yellow plus magenta equals 2 red plus green plus violet.

(Red plus green plus violet equals white), and we have for the second part of the equation as a final result yellow plus magenta equals red plus white, or we have red predominating, and as this appears over two thirds of the area and the lines are so fine that they disappear as lines, we have a red picture of a red object.

In the same way magenta plus blue-green equals violet plus white, yellow plus blue-green equals green plus white, so that by the proper distribution of the three complementary colors, yellow, magenta and blue-green the three primary colors can be produced and, of course properly distributed to produce all of the color effects wanted.

Therefore, when I produce the positive of a red object by the process above outlined we will not have a final record opposite the portion of the negative which registered with the red record, but opposite to the other two portions, these other two portions of the print blank show yellow plus pink, which equals white plus red-orange and the eye will see a red object occupying not one third of the plate in accordance with the red record on the negative, but two-thirds of the plate, and as the lines thus produced are close enough together, the eye will see the whole object as red. The same effects are produced by other colors, so that for the record of the green rays I obtain the yellow plus blue and for the violet rays I obtain pink plus blue.

If I were to register the pink of the plate with the red record of the negative, the deeper the red printed on the negative the less printing effect I could produce upon the positive to show red. In other words if the red record were deep no record would be produced by exposure upon the red beneath and consequently all of the red being thus unhardened, would wash away leaving the positive blank in the red space.

In my complementary method, if there were but few red rays to originally record on the negative, some light would get through the red lines and will harden the blue gelatine line beneath and the blue will modify the red produced by the pink and yellow lines and reduce the intensity of the final positive to accord with the slight red tint in the object. I have then this principle as operative in the production of pictures; the stronger the red the less the blue will appear in the positive and the pink and yellow appearing will show intense red, the less red rays recorded the more the blue will show, which will cut down the red appearance of the pink and yellow and so accord with the color of the object, and likewise for the other colors.

As explained above, the color value negative produced by a lined screen plate and the printing of colored pictures on a similarly lined print blank from the negative constitutes the foundation of my invention, but it will of course be understood that many further processes, steps and details are involved in the commercial production of colored pictures, using the methods described as the foundation.

It is necessary, of course, to produce a proper lined and tri-colored screen and a similarly lined and tri-colored print paper, the lines on the print blank being colored complementary to the colored lines of the screen and to provide means for producing an accurate registration between the color value lines or areas produced upon the negative exposed through the lined screen and the colored lines on the print paper so that the final printed picture produced when the paper is exposed beneath the negative shall have the proper distribution and value of color, to produce a colored picture of the object in its true and natural colors.

*Taking screen.*

As described hereinbefore, my improved screen consists of a lined screen which has on it fine lines of proper dimensions and colors and ruled regularly so that mechanical duplication is possible and so that they may be interchangeable in use.

Figure 18:
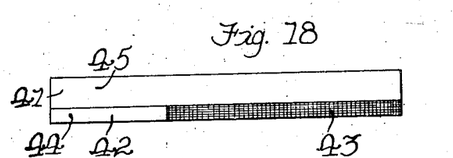
Figures 18 to 29 inclusive are similar views illustrative of the several steps and processes involved in the production of my improved screen.
Figure 19:
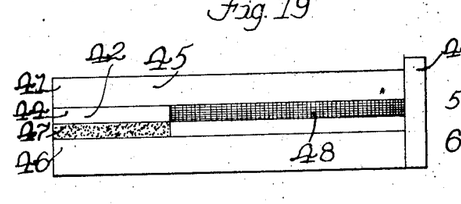

In describing the making of my line screen, I will first refer to the three line screen, with three wide bands covering the entire plate, as is shown in Figure 5 and referring especially to Figures 18 to 24 inclusive. To make such a screen we will first rule mechanically on a suitable opaque medium similar to a "Levy" half tone screen 41, Figure 18, ruling off one-third 42 of the plate 41 so that two-thirds 43 of the plate is black and one-third 42 being clear glass, as illustrated in Figure 18. In said Figures 18 and 19, 44 is a lined surface of such a plate and 45 is a glass backing. The black portion 43 is two-thirds of the width of the plate and the clear portion 42 is one-third of the width of the plate, and the plate is of the same width as the former three lined plates or the plates having three broad bands which I have previously considered and as shown in Figure 5.

If I take a clear or gelatine coated plate 46, Figure 19, and treat the same with potassium bichromate in the usual manner so that it is sensitive to light, and expose it to light through the lined plate or screen 40, as shown in Figure 19, the light will harden the one-third 47 of the plate 46 which is exposed below the clear portion 42 of the plate 41 and will leave the other two-thirds of the plate 46 unaffected or soft. (Hard, of course, means insoluble in warm water and soft means soluble.) In such printing we will register the two plates by placing one edge of each against a straight edge 49' as shown in Figure 19 so that the resultant band 47 of hard gelatine on the plate 46 shall have its edges parallel with the registering or guiding edge of the plate. After exposure the plate can be washed in cold water to remove the potassium bichromate and will appear as shown in Figure 19, where I have indicated the hardened gelatine with dotted sectioning.

As well known in the art, we can select a dye which will not be absorbed by the hard gelatine band 47 and which will color the soft gelatine and we select such a suitable dye for this purpose, selecting one of a blue color. After dyeing the soft gelatine of the plate 46 with such dye, we then fix the dye or mordant it to make it permanent. I can then proceed to dye the hard gelatine in another colored dye such as yellow, which will color or penetrate the hard gelatine and which will not affect the other already mordanted, dyed or soft gelatine. Then I can proceed to mordant the second dye and dry the plate.

Figure 20:
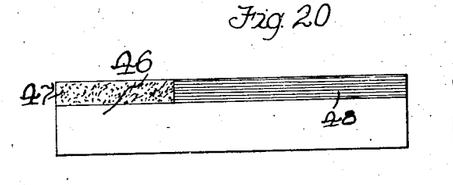
Figure 21:
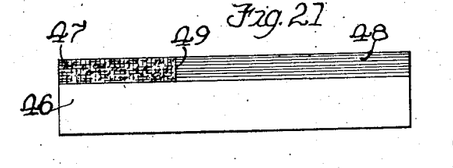

I have illustrated these two steps in Figures 20 and 21 respectively. In Figure 20 the two-thirds portion 48 is shown as being dyed blue and the portion 47 as clear or undyed and in Figure 21 I show the last step, the hard one-third of the plate 47 being dyed a yellow and the soft two-thirds dyed blue. The two parts have a distinct line of division at 49 between them which is parallel with one of the edges of the plate. The colored screen so made will be two different colors but distinctly separated by the line 49 of division between the hard and soft gelatine.

Figure 22:
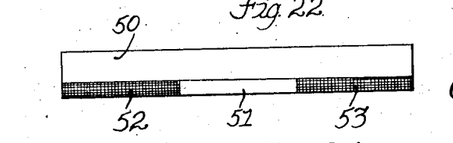
Figure 23:
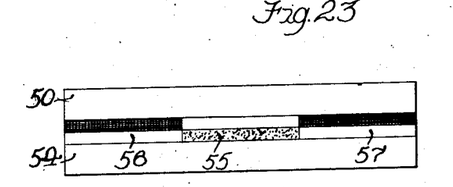
Figure 24:
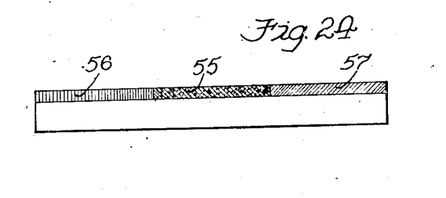

It is my object to produce a screen having three colors instead of two and I illustrate this in Figures 22, 23 and 24. In this instance instead of ruling the original screen plate 50 on one edge I will rule the middle one-third portion 51 so that on either side it is black or opaque as shown at 52 and 53, Figure 22. If I now print a clear gelatine bichromated plate 54 under this negative as shown in Figure 23 the result will be that the middle one-third 55 of this clear plate 54 will be exposed to the light and thus hardened. After I have washed the plate free of the bichromate stains, I can then proceed to dye this plate which is to form our screen. I can now dye one of the soft edge sections 56 in one color for instance red with a dye capable of coloring soft but not hard gelatine, and then dye the other soft strip or side 57 in another like color for instance violet, by means of another dye of like character. Then after mordanting these two dyes I can dye the third or middle section 55 in a suitable color such as green with a dye which will not affect the other two dyed soft sections. The result of this dyeing is shown in Figure 24 where the middle hard section 55 is shown as being dyed a green, one edge 56 as being dyed a red and the opposite edge 57 as being dyed a violet. I can in this manner color the three one-third portions of the screen plate red, green and violet respectively of proper character to use in color photographic work and of suitable density for each color to balance the three colors for direct taking of pictures without the use of an additional balancing filter.

It will now be obvious that if we rule the "Levy" screen which we are to use in the production of a colored screen filter with very fine lines instead of coarse lines as we have illustrated, we can dye the fine lined screen in the manner described, i. e., with three colors of suitable density.

It will now be obvious that if we rule the "Levy" screen, that is the black and white screen, with which the hard and soft lines upon the screen plate are to be produced with fine lines instead of wide bands, we can proceed to line the taking screen in the manner described with three colored lines arranged in successive bands and of suitable density to effect the proper selection or record of colors when this screen is used in front of silver salt negative plates. In order to accomplish this point in a practical manner and be able to select the alternate lines of soft gelatine so that the lines will be arranged in proper rotation, I preferably proceed as follows.

Figure 25:
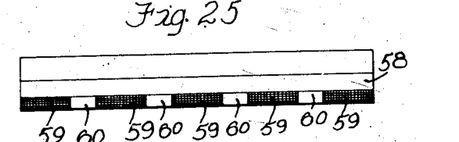
Figure 26:
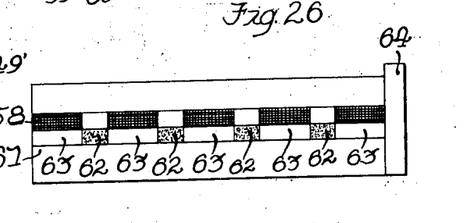

Preferably, though not necessarily, I line a "Levy" plate 58 as is shown in Figure 25 with black lines 59 separated by clear lines 60, the black lines being twice the width of the clear lines, and I then expose a screen plate 61, Figure 26, beneath such a lined plate 58 and produce alternate narrow lines 62 on the screen plate which are hardened and alternate soft lines 63 extending substantially across the plate. It should be understood, of course, that these lines are produced upon the screen plate with the Levy lined plate and the screen plate arranged with one edge of each against the straight edge 64 so that the lines produced upon the screen plate shall be parallel with one of the edges of the plate. It should be understood that the lines 59 and 60 are actually very narrow, preferably about 100 and 200 to the inch and that they are shown in the drawings as greatly exaggerated.

Having provided the screen plate as shown at 61 in Figure 26 with the alternate hard lines and soft lines, the hard lines being one half the width of the soft lines, I have provided two alternate methods for dyeing the lines of this plate with colors which I desire them to have in order to complete the screen.

Figure 27:
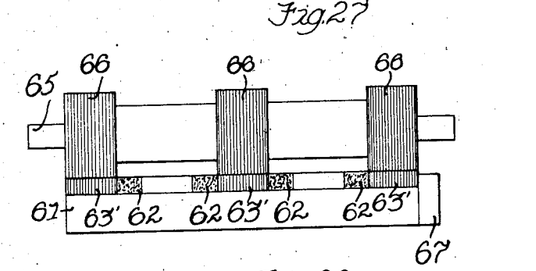
Figure 28:
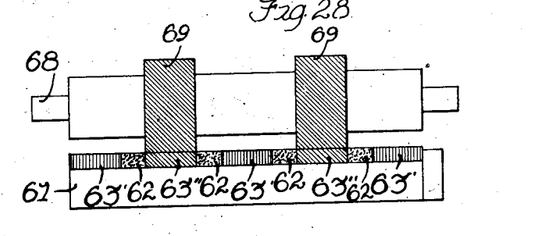

One of these methods is what I term the direct dyeing method and is illustrated in Figures 27 and 28. I provide a roller 65 suitably mounted for rotation in a frame and having printing rings 66 thereon spaced apart to register with every other wide soft gelatine line 63' on the plate 61. I make these rings 66 exactly the width of the soft gelatine lines or bands on the plates 61 and I use these rings for applying the dye to the soft gelatine strips. It will be obvious, of course, that in passing the plate 61 through under the printing rollers the plate would necessarily have to be guided by some suitable means such as the straight edge 67 so that the printing rings 66 shall register properly with the soft gelatine lines and parallel with the one edge of the plate. In this process I make use of a dye which will not affect the hard gelatine. After printing the red dye on alternate lines as shown in Figure 27 I then mordant the dye to make it permanent.

Figure 29:
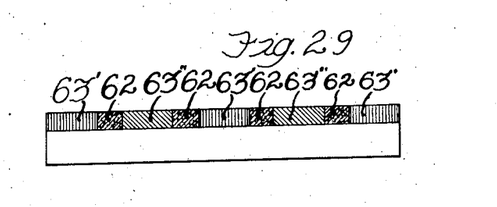

After ruling the red soft lines the alternate soft lines 63″ can be ruled in green and I do this by means of the roller 68 provided with the rings 69 spaced to register with the alternate soft lines 63″. Finally after mordanting the soft colored lines the whole plate can be dipped into a violet dye which does not affect the mordanted lines and the third or hard colored lines are then mordanted and we have a finished screen as shown in Figure 29. It will be obvious, of course, that the order of colors is not important except that a certain order must be preserved in the several steps of the process of making a colored picture. For instance, it may be desirable to rule the soft lines in red and violet or in green and violet instead of red and green.

Figure 30:
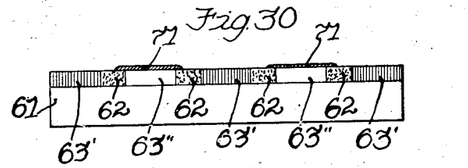
Figures 30 and 31 illustrate a process of dyeing the screen.

Instead of proceeding in the manner described and instead of applying a dye directly to the alternate soft lines, I can protect the alternate soft lines with ink or grease which does not affect them and which can be washed off later, as shown in Figure 30 by passing the plate beneath a roll 70 similar to the inking roll 65 shown in Figure 27, but adapted to apply ink or grease to the plate instead of a dye. As clearly illustrated in Figure 31, this grease 71, which is applied to the plates on each alternate soft gelatine line overlaps the hard gelatine and thus completely protects and covers the soft gelatine which it is applied to. After the protecting grease has been applied as shown at 71, Figure 31, the unprotected lines 63′ can be dyed a suitable color as red by dipping the plate in a red dye which will not affect the hardened lines 62. The soft lines thus dyed can be mordanted and then the grease removed with benzol or some similar solvent.

Figure 31:
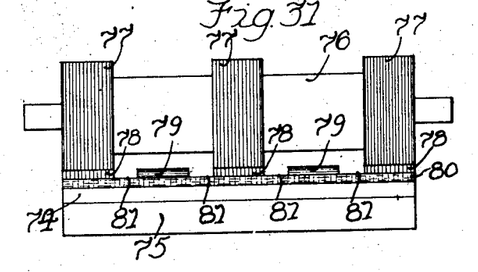

After the plate is thus dyed the colored and mordanted lines can be covered with grease to protect them in the same manner and the alternate soft gelatine lines 63″ dyed a suitable color such as green and mordanted and after the plate has been washed and dried the narow hard lines 62 can be dyed a suitable color such as violet, with a dye which would not affect the soft gelatine lines and then mordanted and the plate is then dried and finished. It is a matter of protection to varnish the plate after it has been finally dyed the proper colors and dried. But whatever method I use for producing the colored lines upon the screen plate, I have when I finish the screen, a screen provided with lines of the three colors, red, green and violet parallel with one edge of the plate, each color occupying a third of the plate. Preferably, as shown in the several manners of making the lines, I provide one line of the three which is half the width of the other two and spaced between each of the other two. This is for the purpose of convenience in dyeing the several lines their proper color in either the printing method or the protective method as desired.

Figure 1:
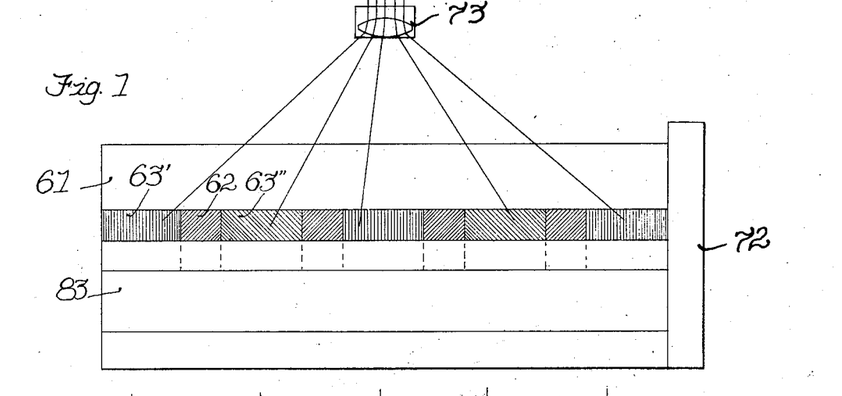
Figure 1, is a diagrammatic view illustrating the method which I employ in exposing a panchromatic negative to obtain a record in monocrome or black and white of the color values of the object to be photographed.

Before exposing the panchromatic plate in the taking of a picture I first firmly bind it up with the screen plate so that the ruled lines on the screen plate are in contact with the film of the panchromatic plate. The pack which I thus provide as best shown in Figure 1 is then exposed with the lined screen facing the lens so that all light reaching the panchromatic plate must first be filtered through the lined screen. In order to produce bright clear colors in the finished picture exact registration in each step is necessary and also it is necessary that the error of parallax be reduced to a minimum by holding the gelatine film surfaces in as near perfect contact as possible in each exposure to light. While this may be effected in different ways I prefer to accomplish it by the vacuum method disclosed and claimed in my co-pending application, Serial Number 266,537 filed Dec. 13, 1918.

It will be understood, of course, that in thus exposing the panchromatic plate to the light through the lined screen the plate and the screen are registered with each other by some means such as the straight edge 72 shown in Figure 1, or in binding the two plates together to form a pack they are placed in relation to each other so that they register along one edge parallel with the lines on the screen plate and are thus held while the panchromatic plate is exposed to the light. Consequently after the plate has been exposed there will be parallel light value lines on the panchromatic plate produced beneath the several parallel colored lines on the screen plate. These lines produced upon the panchromatic plate will be the record of the light value of the several colored rays, red, green and violet, and furthermore they will be parallel with one edge of the plate. I do this so that the plates can be separated and again joined to fall into exactly the same physical relation so far as the parallel lines go, and also as hereinbefore explained, so that I can relate the exposed panchromatic plate to a printing sheet and control the relation between the light value parallel lines produced upon the panchromatic plate and the colored lines which I prepare upon the paper sheet upon which I am going to produce my final picture. It will be understood, of course, that in Figure 1 I have shown simply a diagrammatic view indicating that the plates are held against a straight edge and it will be understood, of course, that they will be clamped within a proper holder for placement within a photographic apparatus and properly held or clamped by some means in the contact relation explained, while they are exposed to the light through the objective 73. In other words, the straight edge 72 may form a part of the plate holder in which the two plates are clamped for exposure. It will be understood that other means than the straight edge 72 can be provided for causing the plates to properly register with each other in the manner described.

After the plate has been exposed it is then developed in the usual manner. This is best done in the dark as any colored light which might be used will probably fog the panchromatic plate.

*Printing the picture.*

In addition to the foregoing described means and methods of producing a panchromatic negative having related areas which present color values of the associated colors necessary to make up the whole spectrum and preferably as described being a record of the red, green and violet rays, my improved color photographic process also includes means and methods of producing a colored reproduction of the original from such plate and the production of a suitable print blank for use with the color value panchromatic negative and the means for automatically or otherwise producing a suitable registration between this panchromatic negative and the print blank which will result in the proper and necessary reproduction of the colors on the picture or positive to properly reproduce the colors of the original. As mentioned hereinbefore I preferably make use of what is termed the complementary system of colors in this reproduction of the colors of the original article of which a picture is to be produced and as hereinbefore particularly described in reference to Figures 12 to 17 inclusive.

Figures 32, 33, 37:
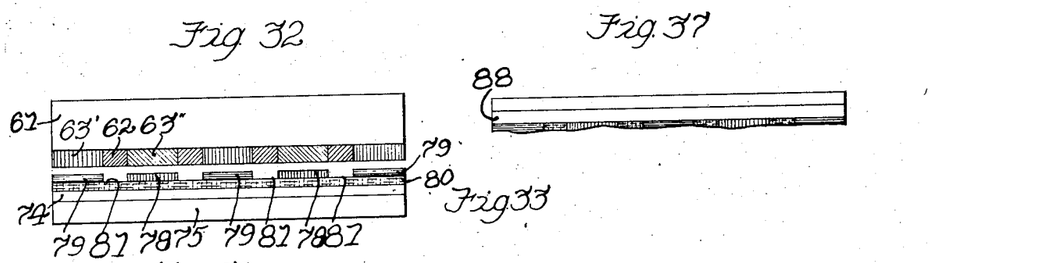
Figure 32 is a diagrammatic view illustrating my improved process of preparing a print blank for use in my color photographic process.
Figure 33 illustrates the registration which is necessary between the screen and the print blank.
Figures 34 to 38 inclusive are diagrammatic views illustrative of the method of completing or finishing a picture which has been produced by my improved color photographic process.

It will be understood, from what has gone before, that in order to produce a colored picture from the black and white color value record which I have produced, it is necessary to prepare a suitably lined colored print blank having the complementary colors thereon in lines adapted to register accurately with the color value lines of the negative and an important feature of my invention resides in the method and means which I have provided for producing such a print blank. I preferably provide a ruled or printed paper 74, Figures 2, 32 and 33, mounted upon a suitable backing such as metal or glass plates 75 and so ruled as to correspond in register to the three colored lines of the taking screen. A similar roller printing process to that used for dyeing the colored screen lines as described hereinbefore may be used, although, of course, it may be and is practical, by means of zinc plates having their ridges of proper width and spacing, to print the colored lines corresponding to the soft gelatine lines of the screen and so printed by proper registering apparatus as to make the three colored lines correspond to those of the screen. It will be understood, of course, that if the plates are used, but two plates will suffice for the third or alternate color may be spread over the entire paper surface and the other two colors printed on top of it, leaving exposed a one half width line of the original whole surface. As shown in Figure 32, I preferably provide a roller 76 having flat printing bands or rings 77 properly spaced to print alternate wide lines 78 on the paper 74, these bands 78 being spaced to correspond with the one set of wide lines on the screen plate, and as explained in relation to the production of the screen plate, I make use of alternate rollers for printing the other color lines 79 on this paper backing. I can, as indicated in Figure 32, spread the yellow color 80 on the whole surface of the print paper 74 and then print the pink and the blue colored gelatine ink upon the yellow backing thus prepared, the pink and the blue, 78 and 79, being of double width and providing yellow lines 81 in the spaces between them of half width, and providing a print paper having yellow, pink and the blue in the proper relations and widths to correspond with the violet, green and red respectively of the lined screen plate.

In Figure 33 I have shown the screen plate and the print paper thus prepared in associated registered relation with the colored lined screen, the broad band of pink 78 of the print paper 74 beneath the green band 63″ of the screen, the broad blue band 79 of the print paper beneath the red band 63′ of the screen and the narrow yellow alternate bands 81 of the paper beneath the alternate and narrow bands 62 of the screen which are violet.

It will be understood, of course, that in practice the print paper and the screen are never thus associated, but the screen is associated with the panchromatic negative and then later on to produce the final print the negative is associated with the prepared paper.

The ink which I use for preparing these papers is of the gelatine or glue order having the proper pigments in them to give the three colors, blue, pink and yellow, which are the complementary colors of the screen plate, red, green and violet. Having printed these lines upon the paper, I then treat the paper with potassium bichromate to make it sensitive to light; the paper is then ready for the reproduction of the picture in colors.

I have illustrated this final printing operation in Figure 2 of the drawings wherein I have shown the developed panchromatic negative 83 above the print paper 74, the several light value lines of the record being arranged in proper superposed registered position to the several colored lines of the print paper as heretofore described, and I preferably expose the negative and the paper thus registered and arranged to parallel light rays as indicated to reduce the error of parallax. It will be understood that a very important point in arranging the negative and print paper for exposure is that a proper registry of the lines and colors must be effected as described and one method of doing this is to place the two plates with the registering edges against the straight edge 84 as shown in Figure 2 and thus cause the several lines in the two plates to register in their proper relation to the several colors. It will be understood that the several colors of ink on the print paper are simply dyed several colors so as to produce in the plate itself the color desired, and having disposed the paper beneath the panchromatic negative, a record is obtained upon the paper and that the exposure of the paper beneath the negative as has been explained hereinbefore hardens the gelatine to various depths, depending upon the penetration of the light through the negative, but the picture is as yet undiscernible and I preferably proceed as follows to produce the record in visible form.

Figure 34:
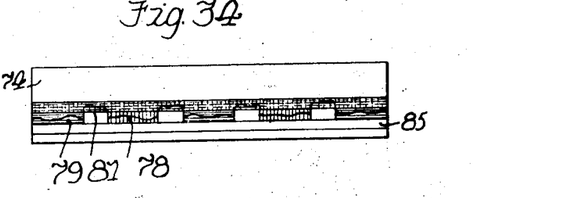
Figure 35:
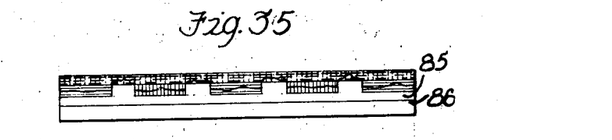
Figure 36:
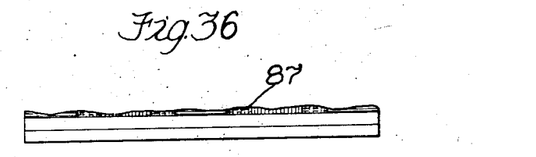
Figures 38, 39, 40:
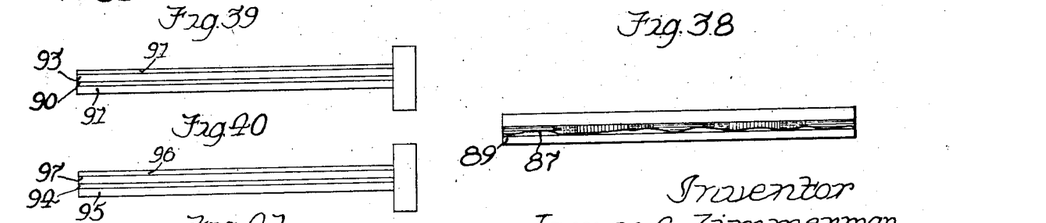
Figures 39 to 41 inclusive are diagrammatic views illustrating my method of causing the color-print to more nearly present the true light values of deep shadows and dark objects.

The record on the print is not yet visible—it is only a surface on which there is a printed record of variable depth all over into the three colors of gelatine, which record is insoluble in warm water, the remaining gelatine parts of the colored lines of the paper are soluble. To make the print visible we must first soak the print in cold water to wash out the bichromate of potash (which is yellow) and to soften the whole gelatine surface but not to wash any away. I now proceed in accordance with what I term the transfer process. In this process I provide a sheet of transfer paper or transfer surface which has a hardened gelatine surface 85 Figure 34, equal in extent to the print which has been made, which after wetting will stick to the hard gelatine of the print and I roll it into close and firm contact therewith. It will be seen from examining Figure 34 that the transfer paper 86 is provided with a hardened gelatine surface 85, that when it is placed in contact with the printed sheet the hardened flat surface of the transfer paper will contact with the blue and pink lines of the paper, as these are higher than the yellow lines thereof. As shown in Figure 35 I force the gelatine of the print paper 86 into contact with the yellow of the print paper by applying pressure to the paper in the well known process of squeegeeing and consequently the whole surface of the print paper is thus brought into intimate contact with the gelatine of the transfer paper. After first firmly rolling the transfer paper into intimate contact with the print surface the whole is then immersed into warm water which will loosen the paper back of the print and dissolve the soft gelatine from the print and allow the two papers to be separated, the transfer paper taking along with it the printed or hardened gelatine face of the print. Then the transfer record is washed until the soft gelatine is all washed away from the hard record and the print stands out in full colors. This latter process is well illustrated in Figure 36 which indicates the undulated surface 87 of the colored lines which show the varying thickness of the hardened gelatine and which produce the lights and shadows of the picture. As the record is now reversed from normal or natural it may again be transferred to another white backing 88, Figure 37, in the usual double carbon transfer process. Or, if we use a thin clear glass or celluloid film having the hardened gelatine surface for transfer, we can simply paste same down to a white backing and provide a protective cover for the carbon print or color photograph. In Figure 38 I have illustrated the colored record 87 protected by a cover 89.

As used herein the word negative is sometimes used in its more general meaning of a plate to be exposed upon which to produce a negative print.

In making a picture which includes black objects or deep shadows which reflect very little or no light, it is some times desirable to make compensation therefor so that the resultant picture will properly portray such object. This is necessary because the silver negative taken thru the colored screen will be clear where the image of the black object falls, no light passes thru the screen as none is reflected or emitted by the black object. When a print is made upon my prepared lined paper all of the three colored lines over the area covered by the image of the black object will be fully printed, as the negative is clear and permits a maximum of light to strike the print paper and the result will be that the image will not appear in the picture as black but as more or less white, not being clear white because some light rays will penetrate the colored screen even over the area of a black object.

The compensation that is spoken of above is therefore necessary to decrease the light reflected from such portions of the picture, to deepen the shadows and to make the black or dark objects appear more nearly in their true tone value. I accomplish this by combining with the color picture, a black and white silver print or positive made from the same color-value negative and associate this black and white print with the color print in some manner so that the dark portions of the silver print will tone down the colors of the color print. It is, of course, necessary to register the silver print with the color print, but as these have both been registered with the same negative, this is an easy matter to accomplish by means of my straight edge scheme of registration already explained.

It will be understood, of course, that the silver print will show black or dark over the areas covering the deep shadows or black objects and when placed over the color print in line registration therewith will darken or decrease the light coming from the colored lines covering such areas.

In Figure 39 I have shown a method of toning the color print 90 mounted an a white background 91 and overlaid by a black and white positive 92 on a transparent celluloid or glass plate 93. In this case the light, when looking at the picture, penetrates to the white background 91, thru the black and white color value positive and thru the color film picture and is then reflected back again so that the eye sees the color picture toned down or veiled by the black and white positive. The effect is similar to the thin black ink impressions which are often used in the three color printing process to give the picture more tone.

Instead of making the black and white positive on a transparent backing and looking thru it to the picture I can print the black and white positive on a paper such as velox and mount the transparent color film over it in registration therewith. I illustrate this method in Figure 40, in which 94 is the black and white positive on a paper backing 95 and 96 is the color gelatine print, which of course is more or less transparent and mounted on a transparent backing 97.

Figure 41:
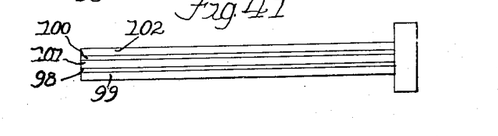

Instead of either of the above methods I may also produce the final picture in the form of a transparency or lantern slide, producing the color gelatine picture 98 on a transparent backing 99 such as glass or celluloid, and then place a black and white positive print 100 also made on a transparent backing 101 such as glass or celluloid, over the color picture and in registration therewith, then by looking thru the transparent combination or pack thus produced, the dark shadows and black or dark objects will be toned down by the dark printed areas of the black and white print. To complete the transparency I can then place a clear or transparent cover plate 102 to protect the exposed print and combine the several plates into a pack.

It will be understood that in making the black and white positive print for this purpose, it is printed to such a depth as may be necessary to produce the best results, and is usually, if not always, a thin or very light print, as this will accomplish all that is necessary to tone down or reduce the colors of the deep shadows and dark objects.

While I have described my invention as making use of the silver salt or negative process for producing the light value record for use with the tri-colored print paper and also of producing the light value record in associated narrow lines parallel with one edge of the plate, it should be understood that my invention is not thus limited, as many modifications of my invention will readily suggest themselves to those skilled in the art, I do not intend that I shall be limited to the specific steps and structures, nor to the precise order of procedure herein illustrated and described.

I claim:

1. The herein described method of producing colored pictures by photography which consists in exposing a sensitized plate beneath a suitable multicolor selective screen, and printing a colored positive directly from such a negative.

2. The herein described method of producing colored pictures by photography which consists in exposing a sensitive plate beneath a screen having associated areas colored red, green and violet, and after development exposing a gelatine positive beneath the negative, the positive having areas respectively colored blue, pink and yellow adapted to register respectively with the red, green and violet records.

3. The method of producing colored pictures by photography, which includes making a record on a negative of the three primary colors in associated areas, then making a positive from the negative on a print blank presenting the three complementary secondary colors in such a manner that each of the primary colors appears as a combination of two of the secondary colors.

4. The method of color photography which includes the exposure of a panchromatic sensitive plate beneath a screen provided with associated areas of violet, green and red, then printing a positive from the sensitive plate after development, the positive having registering areas respectively of yellow, pink and blue, so that the red record in the negative blocks out the blue in the print, leaving yellow and pink on the print, and similarly for the other color records.

5. The herein described method of producing colored photographs which consists in exposing a sensitive plate through a screen having definite related areas of colored light ray selective portions, developing the sensitive plate thus producing a negative having records of similar related areas of color values, and printing a positive through said negative, the positive having similarly disposed areas of film colored complementary to the colors of the related color selective areas of the screen and completing the picture thus printed.

6. The herein described method of producing colored photographs which consists in exposing a sensitive plate beneath a suitable screen, to produce a negative having definite known areas forming records in black and white of the color values of the scene being photographed, finishing the negative and exposing a print blank having similarly related areas of colored gelatine film through the negative and completing the positive thus printed.

7. The herein described method of producing colored photographs which consists in providing a screen plate and a gelatine print blank having similarly disposed relatively small areas adapted to register with each other, the areas of the screen having a color selective function and adapted to produce a negative having similar areas which are records of the colors selected by the areas in the screen, the areas of the print blank presenting colors related to the similar areas of the screen, exposing the sensitized blank beneath said screen and developing the negative, then exposing the related print blank beneath the negative whereby the light value areas of the negative are impressed upon similar areas upon said print blank and finishing the picture.

8. The herein described method of producing colored photographs which consists in exposing a sensitive plate beneath a color screen having associated colored lines in groups of three principal colors, thereby producing on the negative similar lines having related color values, exposing a similarly lined and colored print blank beneath the said negative having the color value lines in proper registry with the complementary colored lines in the blank, and then finishing the picture.

9. The herein described method of producing colored photographs which consists in exposing a panchromatic sensitive plate beneath a color screen having associated groups of colored lines adapted to pass red, green and violet rays respectively, finishing the negative and exposing a print blank beneath the negative having a gelatine film formed of similarly arranged lines colored respectively blue, pink and yellow, causing the red record on the negative to register with the blue of the print blank, the green record of the negative to register with the pink of the print blank and the violet record of the negative to register with the yellow of the print blank and then finishing the print.

10. The herein described method of producing a colored picture by photography, which consists in producing a lined color-value negative, making a contact line color positive therefrom, and also making a similar line contact color-value black and white positive therefrom, and combining these two positives to cause the black and white positive to modify the colors of the color positive.

11. The herein described method of producing a colored picture by photography, which consists in producing a lined color-value negative, making a contact line color positive therefrom, and also making a line color-value black and white positive therefrom, on a transparent backing, and placing the transparent black and white position over and in line registration with the color positive, whereby the black and white positive modifies the colors of the color positive.

12. The herein described method of making a colored picture by photography, which consists in producing a lined color value negative, making a contact line color positive therefrom, and also making a line color-value black and white positive therefrom, both said positives being on transparent backings, and placing said positives in line registration with each other so that the light transmitted therethru will be modified both by the color positive and the black and white positive.

13. The herein described method of producing a colored picture by photography, which consists in producing a line color-value negative, making a contact line color positive therefrom, on a transparent backing, and also making a line color-value positive in black and white on an opaque backing and placing the color positive over the black and white positive in registration therewith, so that the colors of the color positive are modified by the underlying black and white positive.

14. In a process of producing colored pictures by photography, the step of producing a color effect which consists in producing complementary colors in juxtaposed areas.

15. In photography, the process of producing a primary color effect which consists in producing two colors in juxtaposition the colors selected to produce the primary color desired plus white.

16. In a photographic process of printing pictures in color the step of using the complementary or minus colors additively.

17. In a photographic process of producing pictures in colors the step of using the complementary pigment colors additively upon a white or similar surface to produce the effect of primary colors.

18. The method of providing colored pictures by photography, which consists in exposing a sensitized plate beneath a screen having associated color selective areas, developing the sensitive plate after exposure to produce a negative having like associated areas of color record areas, exposing a sensitized plate beneath the negative to produce a positive, said positive having colored areas complementary in color and corresponding in relation to the color selective areas of the screen.

19. The method of producing colored pictures which includes exposing a photographic surface through a taking screen comprising primary color filters, and printing from the record obtained thereby on a surface having corresponding areas in complementary colors in register with their respective taking screen colors.

20. The method of producing colored pictures which includes exposing a photographic surface through a taking screen comprising primary color filters, printing from the record obtained thereby on a surface having corresponding areas in complementary colors in register with their respective taking screen colors, and removing the unexposed portions of the complementary colors from the printing surface.

21. The method of producing colored pictures which includes exposing a photographic surface through a taking screen comprising primary color filters, printing from the record obtained thereby on a surface having corresponding areas in complementary colors in register with their respective taking screen colors, and transferring the exposed portions of the complementary colors in the printing surface to another surface.

22. The method of producing colored pictures which includes exposing a photographic surface through a taking screen comprising primary color filters, and printing from the record obtained thereby on a surface having corresponding areas in complementary colors in register with their respective taking screen colors, said record being sufficiently printed to allow the complementary record to adhere to the printing surface.

23. The method of producing colored pictures which includes exposing a photographic surface through a taking screen comprising primary color filters, printing from the record obtained thereby on a surface having corresponding areas in complementary colors in register with their respective taking screen colors, said record being sufficiently printed to allow the complementary record to adhere to the printing surface, and removing the unexposed portions of the complementary colors from the printing surface.

24. The method of making a colored representation or picture of an object which comprises juxtaposing in regular sequence parallel lines of three complementary colors and varying the intensity of the colors to correspond to the variations of color of the object represented.

25. The method of producing a colored representation of an object which comprises, juxtaposing parallel lines of primary colors in sequence, regulating the quantum of color per line, and adding the effects to produce an integral representation of the object.

26. In the process of making a colored image of an object, the step of producing an additive color effect which comprises juxtaposing limited areas of complementary colors.

27. In the process of coloring an area with variegated colors, the combination of the following steps, dividing up the area into substantially parallel strips of relatively small transverse width, applying a plurality of primary complementary colors to said areas in predetermined sequence, and varying the intensity of coloring of said strips over said area, and integrating said colored strips.

28. The method of forming a colored image of an object which comprises, juxtaposing upon a surface parallel lines of a plurality of complementary primary colors in regular sequence, then varying the intensity of color of said lines to leave a predominance of color of the desired value.

29. The method of forming a colored image of an object which comprises, juxtaposing upon a surface parallel lines of a plurality of complementary primary colors in regular sequence, then varying the intensity of color of said lines to leave a predominance of color of the desired value, and integrating the light from said juxtaposed color lines.

In witness whereof, I hereunto subscribe my name this 4th day of December, 1918.

JAMES G. ZIMMERMAN.